Patented Jan. 12, 1954

2,666,081

UNITED STATES PATENT OFFICE 2,666,081

METHOD OF PURIFYING PERCHLOROMETHYLMERCAPTAN

John W. Churchill, Kenmore, N. Y., assignor to Mathieson Chemical Corporation, a corporation of Virginia No Drawing. Application December 18, 1950, Serial No. 201,499

4 Claims. (Cl. 260—543)

This invention relates to improvements in the manufacture of perchloromethylmercaptan and more particularly to methods for the purification of perchloromethylmercaptan as it is commercially prepared.

Perchloromethylmercaptan has been prepared by several processes but the only one of commercial interest is the direct chlorination of carbon bisulfide. In this process iodine is ordinarily used as a catalyst although other chlorination catalysts have been and may be used. The reactions involved are as follows:

$$2CS_2 + 5Cl_2 \rightarrow 2CCl_3SCl + S_2Cl_2 \quad (1)$$
$$2CS_2 + 6Cl_2 \rightarrow 2CCl_3SCl + SCl_2 \quad (2)$$

The process is best carried out at temperatures below 30° C. and in diffused light or darkness since at higher temperatures or in the presence of sunlight considerable by-product carbon tetrachloride may be formed according to the equation:

$$2CS_2 + 8Cl_2 \rightarrow CCl_4 + 4SCl_2 \quad (3)$$

While the formation of carbon tetrachloride is comparatively readily avoided by control of light and temperature, the chlorination mixture, consisting largely of perchloromethylmercaptan boiling at 146.5° C., invariably contains molar amounts, according to the above equations, of sulfur monochloride boiling at 136° C. and sulfur dichloride boiling at 59° C. While the separation of sulfur dichloride from the mixture by distillation is relatively easy, the close boiling points of the sulfur monochloride and the desired product require more careful fractionation than is economically feasible. Steaming the reaction mixture serves to decompose to a considerable extent the sulfur chlorides but large volumes of steam are required and the decomposition is not complete. The steam distilled oil still contains some sulfur chlorides and the large volume of aqueous condensate contaminated with perchloromethylmercaptan and sulfur compounds presents a difficult disposal problem.

I have found that the sulfur chlorides, so difficult and expensive to separate from the perchloromethylmercaptan produced commercially by the above process, may be practically and economically separated from the perchloromethylmercaptan by converting them to elemental sulfur. Moreover, in the reaction in which the sulfur chlorides are converted to elemental sulfur, additional perchloromethylmercaptan is formed, thereby increasing the yield of perchloromethylmercaptan to as much as 98% of theory.

According to the present invention, perchloromethylmercaptan is prepared in the usual commercial manner by direct chlorination of carbon bisulfide at a temperature below about 30° C. in the presence of a catalyst and in the absence of direct illumination, and the chlorination mixture is purified by refluxing it with excess carbon bisulfide above the stoichiometric amount required for reaction of by-product sulfur chloride present, i. e. about 10% or more in excess of that theoretically required to convert the sulfur chlorides to elemental sulfur and additional perchloromethylmercaptan according to the equations $$2S_2Cl_2 + CS_2 \rightarrow CSCl_4 + 5S \quad (4)$$
$$2SCl_2 + CS_2 \rightarrow CSCl_4 + 3S \quad (5)$$

The elemental sulfur then may be filtered from the reaction mixture, and the perchloromethylmercaptan recovered by distillation. The distillate having a boiling point of about 146° C. is substantially pure perchloromethylmercaptan, a very light yellow oil of unpleasant odor.

In one method of practicing my invention, carbon bisulfide may be chlorinated to form perchloromethylmercaptan in the conventional manner in the absence of direct illumination and in the presence of iodine as a catalyst at a temperature of not over about 30° C. until the volume of the reaction mixture has increased to 2 to 2.5 times that of the original carbon bisulfide. At this point the amount of chlorine introduced is about that theoretically required by equations (1) and (2) above and amounts to the addition of about 200 parts by weight of chlorine per 76 original parts by weight of carbon bisulfide. Additional carbon bisulfide is added in an amount about 10% or more in excess of that theoretically required by equations (4) and (5) to react with the sulfur chlorides in the mixture to form additional perchloromethylmercaptan. The iodine originally added may be used as catalyst in the secondary reactions but it is preferable to add additional catalyst in an amount of from about 0.1 to 2% based on the additional carbon bisulfide added. About 0.3 to 0.4% of catalyst appears to be particularly advantageous in both the primary chlorination and the secondary reaction. After the addition of the supplementary carbon bisulfide and iodine, the mixture is heated to reflux temperature for at least about 1 hour and preferably two to twenty hours in order to complete the reactions. By-product elemental sulfur is advantageously filtered from the reaction mixture and the filtrate distilled, although the whole reaction mixture containing free sulfur may be distilled. A small portion of low boiling material including any carbon tetrachloride formed as a by-product and any unreacted sulfur chloride is first removed. Substantially pure perchloromethylmercaptan is then obtained in the distillate, the by-product sulfur remaining in the pot as a residue unless removed prior to the distillation.

In a variation in this method the lower boiling sulfur dichloride may be removed from the original chlorination mixture by distillation and treated with carbon bisulfide and iodine to form additional quantities of perchloromethylmercaptan while the residual mixture of the perchloromethylmercaptan and sulfur monochloride may be separately treated with additional quantities of carbon bisulfide and iodine in the manner described.

In another mode of practicing my invention, the original chlorination is carried out in the presence of iodine as a catalyst at temperatures below about 30° C. until not over the theoretical amount of chlorine required by the equation:

$$CS_2 + 2Cl_2 \rightarrow CSCl_4 + S \qquad (6)$$

is introduced, i. e. 2 moles of chlorine per mole of carbon bisulfide. This corresponds to a weight increase of about 142 parts by weight of chlorine per original 76 parts of carbon bisulfide. However it is convenient to introduce somewhat less chlorine in order to avoid an excess. I therefore prefer to introduce about 125 to 140 parts by weight of chlorine per original 76 parts of carbon bisulfide. Since the reaction does not proceed below 30° C. according to equation (6) but does proceed according to equations (1) and (2), the mixture at this point contains considerable unreacted carbon bisulfide. Usually about 20% or more of the original number of moles of carbon bisulfide remain unreacted. With or without the addition of more iodine catalyst as necessary, the mixture is refluxed as described above until the reactions represented by equations (4) and (5) are substantially complete. The mixture is then treated as described above to recover the perchloromethylmercaptan.

Although it is advantageous to use iodine as the catalyst in the practice of my invention, other suitable catalysts may be used. Among those which have been found satisfactory are the mixed halogenides of halogens having atomic numbers between 15 and 55, for example, iodine chloride, iodine bromide and iodine trichloride. Other suitable catalysts include antimony and molybdenum chloride.

The reflux temperature of the mixture depends somewhat on the composition of the mixture but it will usually be about 63-67° C. Large quantities of by-product carbon tetrachloride and excess carbon bisulfide will tend to reduce the reflux temperature and longer times of refluxing may be necessary. Since a time of refluxing from 1 to 20 hours may be required to complete the reactions, it may be desirable to carry out the reflux operation under superatmospheric pressure in order to raise the boiling point of the mixture and reduce the time necessary for completion of the reaction.

While the distillation may be conducted at atmospheric presure, it is particularly advantageous in order to avoid any decomposition of the desired product to use reduced pressures. The low boiling impurities may be conveniently removed at atmospheric pressure and the main portion of the product distilled at reduced pressure. Perchloromethylmercaptan boils at about 65° C. at 50 mm. pressure.

The following specific examples indicate how the process of this invention may be practiced and the novel manner in which conventionally prepared perchloromethylmercaptan may be purified. The examples are for purposes of illustration and are not to be construed as limiting the scope of the invention.

*Example I*

A solution of 3.5 parts by weight of iodine in 860 parts by weight of carbon bisulfide was cooled to −1° C. and chlorine introduced over a period of 20 hours maintaining the temperature at about 15–20° C. When the volume had increased to 2.5 times the original volume of carbon bisulfide and amounted to 2786 parts by weight the chlorination was discontinued. A portion of the chlorination mixture amounting to 410 parts by weight was admixed with 63.2 parts by weight of carbon bisulfide and 1 part by weight of fresh iodine and heated to 63–67° C. for 7 hours. On distillation of the mixture a small portion of low boiling material was obtained over a range of 65–120° C. at 760 mm. pressure and the residue was distilled at 50 mm. pressure to produce an excellent yield of perchloromethylmercaptan boiling at 65° C. at that pressure.

*Example II*

To a solution of 2.5 g. of iodine in 1000 g. of carbon bisulfide, 1800 g. of chlorine was added over a period of 24 hours. Light was excluded and the temperature maintained in the range of 10 to 15° C. by cooling with a bath of ice water. The solution of products and catalyst in excess carbon bisulfide was then refluxed over a steam bath for 16 hours. Distillation of this product gave 2250 g. of perchloromethylmercaptan boiling over the range of 81 to 83° C. at 100 mm. Hg pressure.

I claim:

1. In the manufacture of perchloromethylmercaptan by direct chlorination of carbon bisulfide at a temperature below about 30° C. in the presence of a catalyst and in the absence of direct illumination, the improvement which comprises refluxing the reaction mixture obtained by the chlorination of the carbon bisulfide for upwards of an hour with an excess of carbon bisulfide above the stoichiometric amount for reaction with by-product sulfur chlorides present whereby said sulfur chlorides are converted to perchloromethylmercaptan and sulfur, and recovering perchloromethylmercaptan from the refluxed mixture by distillation.

2. In the manufacture of perchloromethylmercaptan by direct chlorination of carbon bisulfide at a temperature below about 30° C. in the presence of a catalyst and in the absence of direct illumination, the improvement which comprises chlorinating the carbon bisulfide to approximately complete theoretical conversion of the carbon bisulfide to perchloromethylmercaptan and sulfur chlorides, adding fresh carbon bisulfide to the chlorination mixture in an amount in excess of that required for reaction with any by-product sulfur chlorides present whereby said sulfur chlorides are converted to perchloromethylmercaptan and sulfur, refluxing the admixture for upwards of an hour, and recovering the perchloromethylmercaptan from the refluxed mixture by distillation.

3. In the manufacture of perchloromethylmercaptan by direct chlorination of carbon bisulfide at a temperature below about 30° C. in the presence of a catalyst and in the absence of direct illumination, the improvement which comprises chlorinating the carbon bisulfide to approximately complete theoretical conversion of the carbon bisulfide to perchloromethylmercaptan and sulfur chlorides, removing sulfur dichloride from the chlorination mixture by distillation and separately reacting it with carbon bisulfide to produce perchloromethylmercaptan, adding fresh carbon bisulfide to the chlorination mixture in an amount in excess of that required for reaction with any by-product sulfur chlorides present whereby said sulfur chlorides are converted to perchloromethylmercaptan and sulfur, refluxing the admixture for upwards of an hour, and recovering the perchloromethylmercaptan from the refluxed mixture by distillation.

4. In the manufacture of perchloromethylmercaptan by direct chlorination of carbon bisulfide at a temperature below about 30° C. in the presence of a catalyst and in the absence of direct illumination, the improvement which comprises discontinuing the chlorination reaction after introduction of not over 2 moles of chlorine per mole of carbon bisulfide, refluxing the reaction mixture obtained by the chlorination of the carbon bisulfide for upwards of an hour whereby the sulfur chlorides produced by the chlorination of carbon bisulfide are converted to perchloromethylmercaptan and sulfur, and recovering perchloromethylmercaptan from the refluxed reaction by distillation.

JOHN W. CHURCHILL.

References Cited in the file of this patent

UNITED STATES PATENTS

| Number | Name | Date |
| --- | --- | --- |
| 2,545,285 | Kamlet | Mar. 13, 1951 |

FOREIGN PATENTS

| Number | Country | Date |
| --- | --- | --- |
| 13,733 | Great Britain | 1901 |

OTHER REFERENCES

Mellor: "Comprehensive Treatise on Inorganic and Theoretical Chemistry," vol. 10 (1930), p. 641.